United States Patent
Rustagi et al.

(10) Patent No.: US 7,876,710 B2
(45) Date of Patent: Jan. 25, 2011

(54) LAYER TWO MAC FLUSHING/RE-ROUTING

(75) Inventors: Sunesh Rustagi, Cupertino, CA (US); Apurva Mehta, Cupertino, CA (US); Ramanarayanan Ramakrishnan, San Jose, CA (US); Rajagopalan Subbiah, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 168 days.

(21) Appl. No.: 12/182,273

(22) Filed: Jul. 30, 2008

(65) Prior Publication Data

US 2010/0027543 A1    Feb. 4, 2010

(51) Int. Cl.
*H04L 12/28*    (2006.01)
(52) U.S. Cl. .................................................. 370/254
(58) Field of Classification Search ............. None
See application file for complete search history.

(56) References Cited

U.S. PATENT DOCUMENTS

| | | | |
|---|---|---|---|
| 6,330,229 B1 | 12/2001 | Jain et al. | |
| 6,490,259 B1 * | 12/2002 | Agrawal et al. | 370/331 |
| 6,801,506 B1 | 10/2004 | Dey | |
| 7,116,672 B1 | 10/2006 | Sivakumar | |
| 2002/0147800 A1 | 10/2002 | Gai et al. | |
| 2003/0198224 A1 * | 10/2003 | Lee et al. | 370/392 |
| 2008/0092214 A1 * | 4/2008 | Zavalkovsky et al. | 726/4 |
| 2008/0240106 A1 * | 10/2008 | Schlenk | 370/392 |
| 2008/0250498 A1 * | 10/2008 | Butti et al. | 726/23 |
| 2009/0003317 A1 * | 1/2009 | Kasralikar et al. | 370/352 |

OTHER PUBLICATIONS

European Search Report corresponding to EP Application No. 09251904.0-2416, Nov. 30, 2009, 8 pages.

* cited by examiner

*Primary Examiner*—Chirag G Shah
*Assistant Examiner*—Amarnauth Persaud
(74) *Attorney, Agent, or Firm*—Harrity & Harrity, LLP

(57) ABSTRACT

A method may include receiving a packet including a destination address, identifying a destination address entry based on the destination address, the destination address entry including an address identifier, comparing the address identifier to an event identifier, determining whether an event occurred based on the comparison, and forwarding the packet on an alternate path if it is determined that the event occurred.

18 Claims, 9 Drawing Sheets

310

EVENT ID COMPARER
320

| STATES 405 | LINK UP | LINK DOWN | BECOME DISABLED | BECOME ALTERNATE | BECOME BACKUP | BECOME DESIGNATED | BECOME ROOT | RECEIVE TOPOLOGY CHANGE |
|---|---|---|---|---|---|---|---|---|
| PORT UP |  | FLUSH FLOOD | FLUSH FLOOD |  |  |  |  |  |
| PORT DOWN |  |  |  |  |  |  |  |  |
| PORT DISABLED |  |  |  |  |  |  |  |  |
| ALTERNATE PORT |  |  |  |  |  | FLUSH O FLOOD | FLUSH O FLOOD |  |
| BACKUP PORT |  |  |  |  |  | FLUSH O FLOOD | FLUSH O FLOOD |  |
| DESIGNATED PORT |  |  |  | FLUSH | REDIRECT |  | FLUSH FLOOD | FLUSH O FLOOD |
| ROOT PORT |  |  |  | REDIRECT | FLUSH | FLUSH |  | FLUSH O FLOOD |

FIG. 4

LAYER TWO MAC FLUSHING/RE-ROUTING

BACKGROUND

In any network environment, forwarding of data traffic is critical since it impacts numerous performance metrics (e.g., throughput, delay, reliability, etc.). In a layer two network, network devices may forward traffic based on media access control (MAC) addresses. For example, a layer two device (e.g., a bridge) may build a MAC address forwarding table as traffic flows through the network. In a typical case, a layer two device may receive an incoming packet that includes source and destination MAC addresses. The layer two device may copy the source address to the MAC address forwarding table along with the port from which the packet arrived. The layer two device may forward packets based on the learned network topology. A protocol (e.g., Spanning Tree Protocol (STP), Rapid Spanning Tree Protocol (RSTP), or Multiple Spanning Tree Protocol (MSTP)) may be employed to help prevent looping, provide redundancy, and afford least cost path forwarding.

During the operation of a network, however, numerous events may arise that impact the forwarding of packets by a layer two device. For example, a layer two port may suddenly go down which may cause traffic to be lost. For example, a linecard in the layer two device may forward packets to the disabled layer two port because the linecard is unaware of the disabled port and relies on forwarding information stored in its MAC address forwarding table. In such an instance, the packets will be lost.

Existing mechanisms for addressing these type of events include flushing the MAC address/port association from the MAC address forwarding tables in each linecard. However, such mechanisms tend to be slow in performance in comparison to the speed of traffic flow. For example, such mechanisms may utilize the resources of a control plane of the layer two device, thereby reducing performance speed.

SUMMARY

According to one aspect, a method may include receiving a packet including a destination address, identifying a destination address entry based on the destination address, the destination entry including an address identifier, comparing the address identifier to an event identifier, determining whether an event based on the comparison, and forwarding the packet on an alternate path if it is determined that the event occurred.

According to another aspect, a device may include a forwarding entity to receive a packet that includes a destination address, determine whether an event occurred that affects a forwarding path of the packet based on a comparison of a first timestamp and a second timestamp, and forward the packet on an alternate forwarding path when the comparison indicates that the event occurred.

According to still another aspect, a computer-readable memory device having stored thereon instructions, executable by at least one processor, may include an instruction to receive a message that includes a destination address, an instruction to identify a first timestamp that indicates when the destination address was learned, an instruction to identify a second timestamp that indicates when the destination address was learned or when an event occurred, an instruction to determine whether the event occurred based on a comparison of the first timestamp and the second timestamp, and an instruction to determine a forwarding path for the message based on an outcome of the comparison.

According to yet another aspect, a layer two network device may include means for receiving a message from another device, means for learning a media access control (MAC) address based on the content of the message, means for assigning a timestamp to the learned MAC address, means for associating an event timestamp with the learned MAC address, means for updating the event timestamp when an event occurs that affects a forwarding path, means for comparing the timestamp and the event timestamp, and means for forwarding the message on an alternate path when the comparison of the timestamp and the event timestamp indicates that the event occurred.

BRIEF DESCRIPTION OF THE DRAWINGS

The accompanying drawings, which are incorporated in and constitute a part of this specification, illustrate one or more embodiments described herein and, together with the description, explain these embodiments of the invention. In the drawings:

FIG. 4 is a diagram illustrating an exemplary state machine table that may be associated with the concepts described herein;

DETAILED DESCRIPTION

Figure 1:
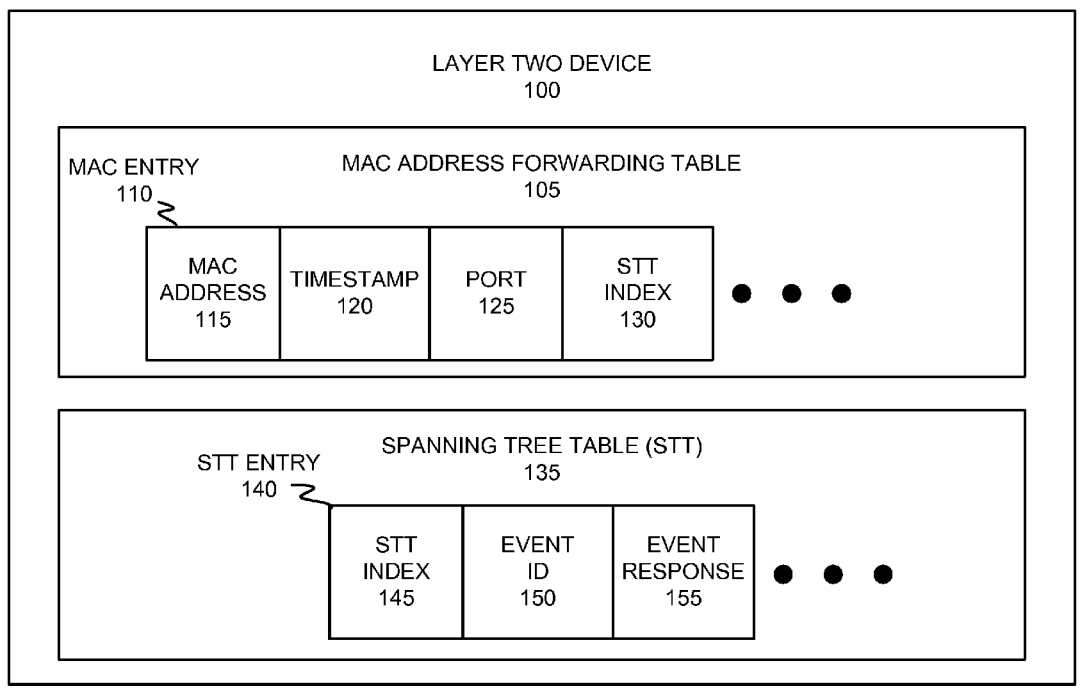
FIG. 1 is a diagram illustrating an exemplary layer two device that may be associated with the concepts described herein.

The following detailed description refers to the accompanying drawings. The same reference numbers in different drawings may identify the same or similar elements. Also, the following description does not limit the invention.

The term "may" is used throughout this application and is intended to be interpreted, for example, as "having the potential to," "configured to," or "being able," and not in a mandatory sense (e.g., as "must"). The terms "a," "an," and "the" are intended to be interpreted to include one or more items. Where only one item is intended, the term "one" or similar language is used. Further, the phrase "based on" is intended to be interpreted as "based, at least in part, on," unless explicitly stated otherwise. The term "and/or" is intended to be interpreted to include any and all combinations of one or more of the associated list items.

The concepts described herein relate to providing information to and updating components of a layer two device because of events that impact the forwarding of traffic. For example, layer two device ports, interfaces, links, etc., may change states (e.g., go down), change roles (e.g., from root to designated), etc., which may impact the forwarding of traffic. Under such circumstances, linecards in the layer two device may forward the traffic flow differently than before the event.

In one implementation, linecards in the layer two device may include, for example, a Spanning Tree Table (STT). The STT may include a timestamp, an epoch (e.g., an integer), and/or another type of identifier (ID) (e.g., a character string). The term "event identifier" or "event ID," as used herein, is intended to be broadly interpreted to include, for example, a timestamp, an epoch, a character string, and the like. As will be described in greater detail below, linecards in the layer two device may compare entries in the MAC forwarding address table and the STT before forwarding traffic. Based on the comparison, the layer two device may determine whether an event occurred in the layer two network. When the linecards determine that an event occurred, the linecards may, for example, forward the traffic in alternate path or take some other type of action in response to the particular event. Additionally, linecards in the layer two device may update their MAC address forwarding tables. For example, linecards may flush a MAC entry in their MAC address forwarding tables.

Although implementations associated with the concepts described herein may be described in reference to the STP or variations thereof (e.g., RSTP, etc.), these concepts are not dependent on employing this or any other particular standard. Rather, the concepts described herein may be implemented with other protocols (e.g., non-standard protocols, proprietary protocols, other standardized protocols, etc.). Additionally, although implementations associated with the concepts described herein may be described in reference to a layer two environment, these concepts may be applied to higher layer environments.

FIG. 1 is a diagram illustrating an exemplary layer two device 100 that includes, among other things, an exemplary MAC address forwarding table 105 and an exemplary STT 135.

Layer two device 100 may include a layer two network device. For example, layer two device 100 may include a bridge, a multi-port bridge, or a switch that operates at layer two of the Open Systems Interconnection Reference Model (OSI Reference Model). Layer two device 100 may receive and forward a packet based on, for example, a destination MAC address included in a packet. The term "packet," as used herein, is intended to be broadly interpreted to include, for example, a datagram, a frame, a cell, or any other type of delivery unit or mechanism.

MAC address forwarding table 105 may include multiple MAC entries. For example, a MAC entry 110 may include, among other fields, a MAC address field 115, a timestamp field 120, a port field 125, and a STT index field 130. MAC address field 115 may include a destination MAC address. Timestamp field 120 may include a time entry that corresponds to when the MAC address in MAC address field 115 was learned or first received by layer two device 100. Alternatively, timestamp field 120 may include an identifier (e.g., a character string) that may be associated with the MAC address. The term "address identifier" or "address ID," as used herein, is intended to be broadly interpreted to include, for example, a timestamp, an integer, a character string, and the like. Port field 125 may indicate a port (e.g., a port number) associated with layer two device 100. STT index field 130 may include an index (e.g., a string) to STT 135.

STT 135 may include multiple STT entries. For example, a STT entry 140 may include, among other fields, a STT index field 145, an event ID field 150, and an event response field 155. STT index field 145 may include an index (e.g., a string) to STT 135. Event ID field 150 may include an event identifier. Initially, event ID field 150 may include a time entry or an identifier value that corresponds to timestamp field 120. However, subsequent thereto, event ID field 150 may change, for example, the time entry or the value when an event occurs. For example, event ID field 150 may indicate a time that corresponds to an occurrence of an event that impacts the forwarding of a packet associated with a MAC address (e.g., of MAC address field 115). Event response field 155 may include information that provides layer two device 100 an action to perform when an event occurs. For example, event response field 155 may instruct layer two device 100 to flush a MAC address from MAC address forwarding table 105, flood the layer two network with a packet, or redirect the packet, as further described below.

In an exemplary operation, layer two device 100 may receive a packet and may determine how to forward the packet based on MAC address forwarding table 105 and STT 135. For example, a linecard (not illustrated) of layer two device 100 may reference a particular MAC entry 110 and a particular STT entry 140 based on STT index 130 and STT index 145. The linecard may compare timestamp field 120 with event ID field 150. If the entries match (e.g., in terms of time or value), then layer two device 100 may forward the packet, for example, according to port field 125. However, if the entries do not match (e.g., event ID field 150 includes a time entry subsequent in time to timestamp 120 or has a different value), then the linecard is made aware of an occurrence of an event. The linecard may then forward the packet based on the information included in event response field 155. For example, depending on the type of event, layer two device 100 may either flood a network with the packet or redirect the packet to alternate path (e.g., to a different port than a port indicated in port field 125).

As a result of the foregoing, a layer two device may forward packets in a manner that reduces the loss of packets. For example, a linecard may be made aware of an event before flushing (i.e., updating) of the MAC address forwarding table occurs. The linecard may then forward a traffic flow based on an event response included in the STT. Since the concepts have been broadly described in relation to FIG. 1, variations and details of the above concepts will be discussed further below.

Although FIG. 1 illustrates an exemplary layer two device 100, in other implementations, layer two device 100 may include additional, different, or fewer data structures (e.g., tables) and/or informational fields than those illustrated in FIG. 1. Additionally, or alternatively, in other implementations, MAC address forwarding table 105 may include fewer, different, or additional informational fields. Additionally, or alternatively, in other implementations, STT 135 may include fewer, different, or additional information fields.

Exemplary Environment

Figure 2:
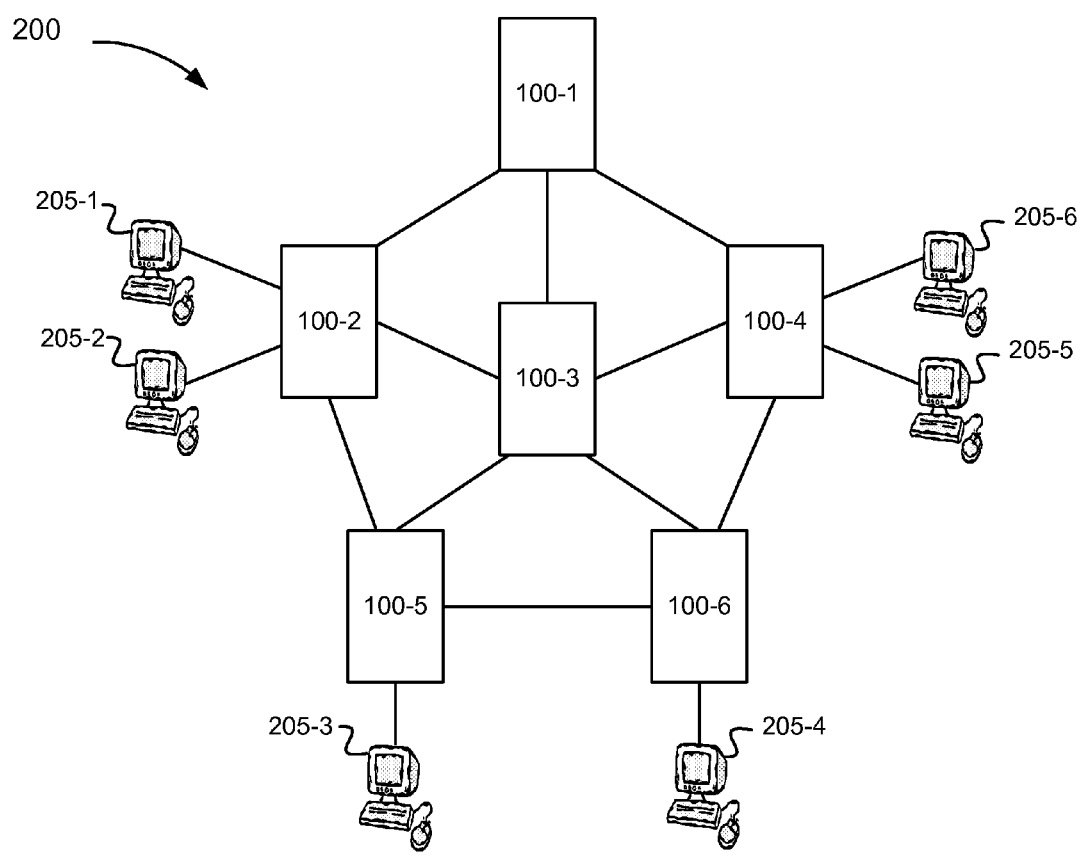
FIG. 2 is a diagram illustrating an exemplary environment in which concepts described herein may be implemented.

FIG. 2 is a diagram illustrating an exemplary environment 200 in which concepts described herein may be implemented. As illustrated, environment 200 may include network devices, such as layer two devices 100-1, 100-2, 100-3, 100-4, 100-5, and 100-6, and user terminals 205-1, 205-2, 205-3, 205-4, 205-5, and 205-6. Layer two devices 100-1, 100-2, 100-3, 100-4, 100-5, and 100-6 may be collectively referred to as layer two device(s) 100. Similarly, user terminals 205-1, 205-2, 205-3, 205-4, 205-5, and 205-6 may be collectively referred to as user terminal(s) 205. Layer two devices 100 may be communicatively coupled. For example, layer two devices 100 may form a LAN, a Metropolitan Area Network (MAN), a Wide Area Network (WAN), or some other type of Ethernet-based network. User terminals 205 may be communicatively coupled via layer two devices 100.

Layer two device 100 may correspond to layer two device 100, as previously described in connection with FIG. 1. Although not illustrated, layer two device 100 may have associated therewith various designations. For example, layer two device 100 may be designated as a root layer two device or a designated layer two device and/or may have a port designated as a root port, a designated port, an alternative port, and/or a backup port, as provided and defined in various STP-based protocols. For simplicity sake, these designations have been omitted from FIG. 2.

User terminal 205 may include a device that allows a user to communicate with another device via layer two devices 100. For example, user terminal 205 may include a computer, a workstation, a personal digital assistant (PDA), a telephone, or some other type of communication device. User terminal 205 may have a network address. The network address may include, for example, a MAC address.

Although FIG. 2 illustrates an exemplary environment 200, in other implementations, environment 200 may include additional, different, or fewer devices than those illustrated in FIG. 2. Thus, it will be appreciated that environment 200 is exemplary in terms of, among other things, the number of devices, the connections between and/or among the devices, etc. The connections in FIG. 2 may be direct, indirect, as well as wired and/or wireless.

Exemplary Components of the Layer Two Device

Figure 3A:
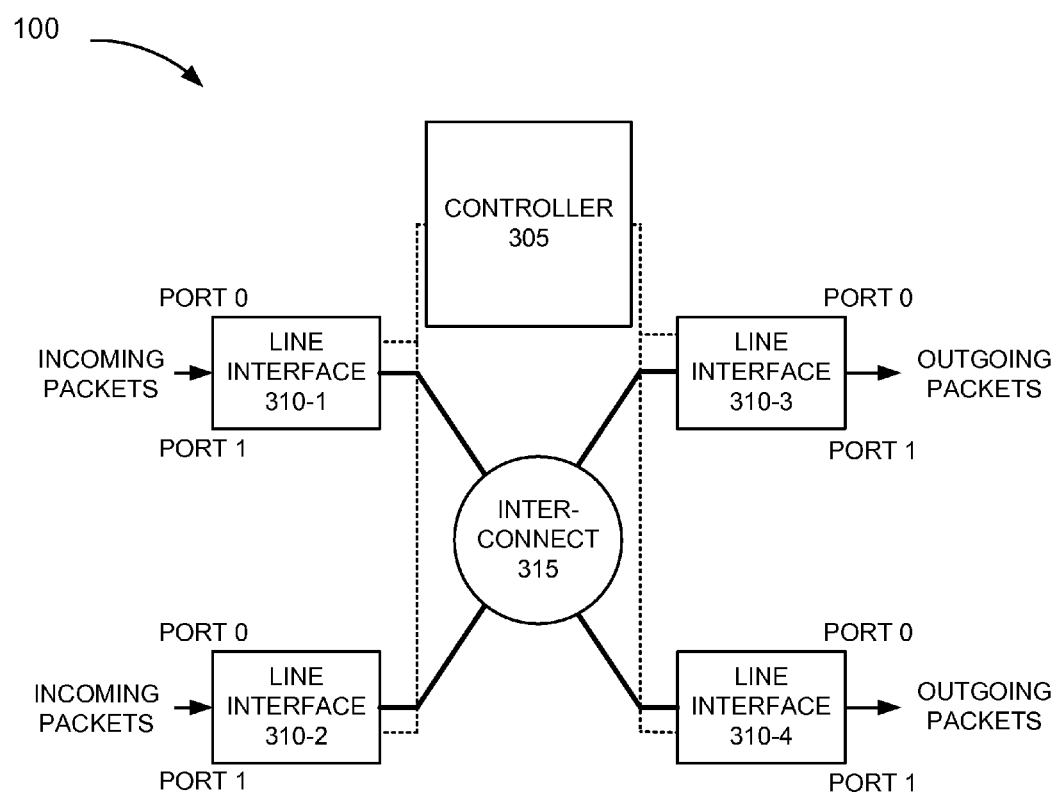
FIGS. 3A and 3B are diagrams illustrating exemplary components of a device that may correspond to a network device depicted in FIG. 2.

FIG. 3A is a diagram illustrating exemplary components of layer two device 100 depicted in FIGS. 1 and 2. A component, as used herein, may include, for example, hardware, software and hardware, software, firmware, etc. As illustrated, layer two device 100 may include, among other things, a controller 305, line interfaces 310-1, 310-2, 310-3, and 310-4 (collectively referred to as line interface(s) 310), and an interconnect 315.

Controller 305 may include, for example, a general purpose processor, a microprocessor, a controller, a data processor, a network processor, a co-processor, an application specific integrated circuit (ASIC), a field programmable gate array (FPGA), discrete hardware components, and/or some other type of component or logic that may interpret and/or execute instructions. Controller 305 may assist in forwarding packets and/or handling traffic flows.

Line interfaces 310 may include, for example, a network interface card (NIC), a communication port, an infrared interface, a Personal Computer Memory Card International Association (PCMCIA) card, a linecard, an ASIC, or another type of line interface component. Line interfaces 310 may be capable of receiving packets from other devices and transmitting packets to other devices in environment 200. Line interfaces 310 may implement industry promulgated protocol standards, non-standard, proprietary, and/or customized interface protocols. Line interface 310 may include one or multiple ports. For example, line interfaces 310 may include ports 0 and 1 for receiving and forwarding packets, as illustrated in FIG. 3A.

Interconnect 315 may include, for example, a switching fabric or another form of a connection (e.g., a bus) for conveying packets to and from line interfaces 310.

Although FIG. 3A illustrates exemplary components of layer two device 100, in other implementations fewer, additional, or different components may be utilized. Further, in other implementations, the configuration of the components, as depicted in FIG. 3A, may be different. It will be appreciated that layer two device 100 may be capable of providing services not specifically described herein. For example, layer two device 100 may be capable of providing authentication and/or encryption services. Additionally, or alternatively, layer two device 100 may be capable of handling traffic flows at higher layers (e.g., layer three or higher).

Exemplary Event Comparer

Figure 3B:

FIG. 3B is a diagram illustrating an exemplary component of line interface 310. As illustrated, line interface 310 may include an event ID comparer 320. In other implementations, event ID comparer 320 may be implemented elsewhere in layer two device 100.

Event ID comparer 320 may include a component that compares timestamp field 120 with event ID field 150. Event ID comparer 320 may determine whether an event has occurred or not based on the comparison. As previously described, if timestamp field 120 and event ID field 150 match, then layer two device 100 may forward the packet based on the MAC address forwarding table 105. However, if timestamp field 120 and event ID field 150 do not match, then layer two device 100 may forward the packet according to information in event response field 155. For example, layer two device 100 may flush one or more MAC entries, flood the layer two network with the packet, or redirect the packet, as will be described in greater detail in connection with FIG. 4.

Although FIG. 3B illustrates an exemplary component of line interface 310, in other implementations fewer, additional, or different components may be utilized.

Exemplary State Machine Table

As previously described, an event may cause layer two device 100 to forward packets differently than if the event did not occur. Described below is an exemplary state machine table that illustrates exemplary states of a port of layer two device 100 and events that may occur (when in such a state) that may impact the forwarding of packets.

FIG. 4 is a diagram illustrating an exemplary state machine table (SMT) 400. As illustrated, SMT 400 includes states 405 and events 410. States 405 may include port up, port down, port disabled, alternate port, backup port, designated port, and root port. These states relate to a state of a port in layer two device 100. Events 410 may include link up, link down, port becomes a disabled port, port becomes an alternate port, port becomes a backup port, port becomes a designated port, port becomes a root port, and port is notified of a change in network topology. The designations (e.g., alternate, root, etc.) correspond to those designations defined by the STP, RSTP, etc. The information associated with SMT 400 may be implemented in line interfaces 310 and/or in other components of the layer two device 100.

As further illustrated in SMT 400, given a particular state 405 and a particular event 410, layer two device 100 may perform one or more operations, such as flush, flood, flush others (illustrated as flush o), and/or redirect. The flush action may provide that layer two device 100 will flush (i.e., remove) any MAC addresses that were learned on the port. The flood action may provide that layer two device 100 will flood (i.e., broadcast) the packet to all other layer two devices. The flush others action may provide that layer two device 100 will flush all MAC addresses that were learned by all other ports excluding the port that received the event. The redirect action may provide that the packet be redirected to another port. In one implementation, this information (e.g., flush, flood, flush others, redirect, etc.) may be stored in event response field 155 of STT 125.

Although FIG. 4 illustrates an exemplary SMT 400, in other implementations, additional, fewer, or different events and/or states may be contemplated for implementing the concepts described herein.

Exemplary Process

Described below is an exemplary process for forwarding packets in a layer two device, such as layer two device 100. Based on the concepts described herein, various components (e.g., line interfaces, ports, forwarding tables, etc.) of the layer two device may be informed of an event and/or updated when an event occurs in a manner that may reduce the amount of time for these processes to take place.

Figure 5:
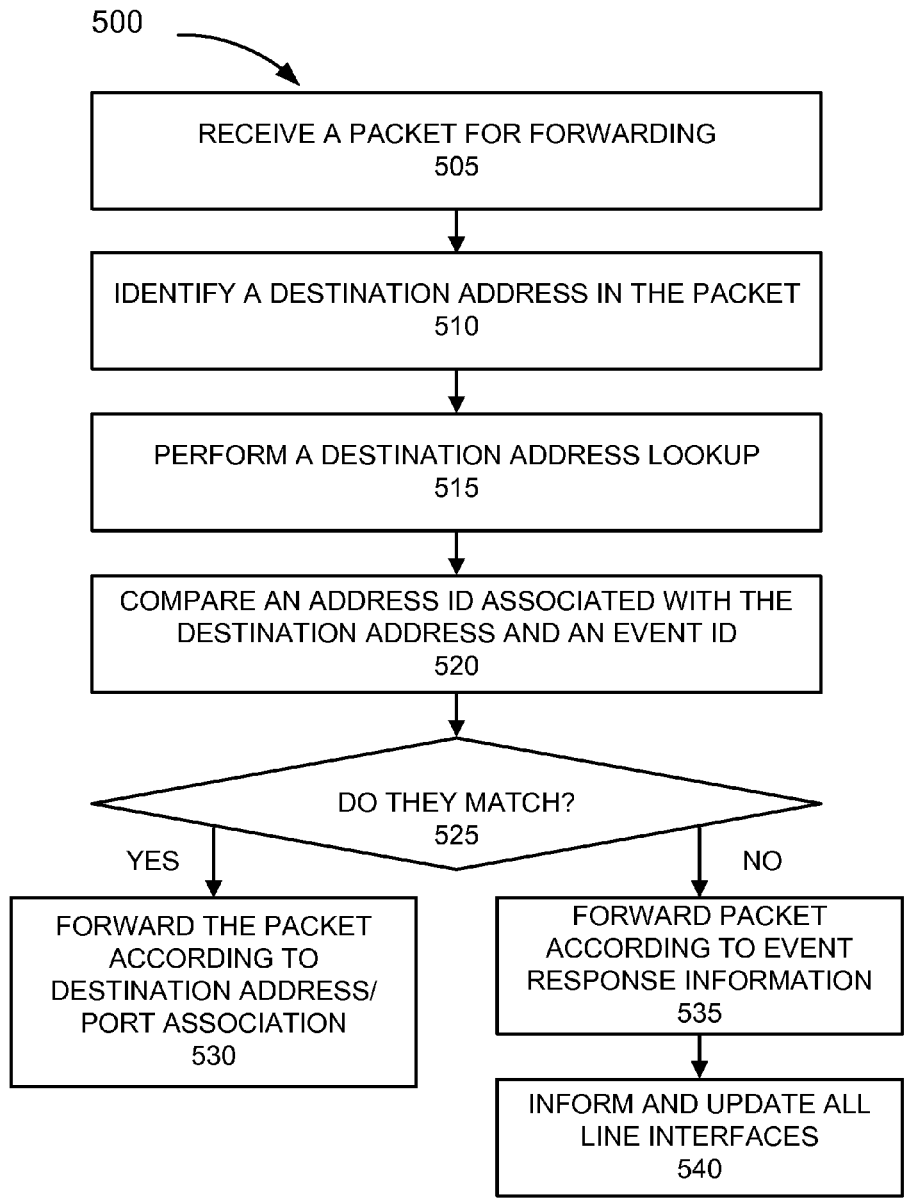
FIG. 5 is a flow chart illustrating an exemplary process associated that may be associated with the concepts described herein.

FIG. 5 is a flow chart illustrating an exemplary process 500. Process 500 will be described in conjunction with other Figures.

Process 500 may begin with receiving a packet for forwarding (block 505). For example, assume layer two device 100-2 receives a packet from user terminal 205-1.

The destination address of the packet may be identified (block 510). Line interface 310-1 may inspect the received packet and determine the destination MAC address included in the packet.

A destination address lookup may be performed (block 515). Line interface 310-1 may consult MAC address forwarding table 105 based on the identified destination MAC address. For example, line interface 310-1 may match the destination MAC address with a MAC entry 110 that includes the same destination MAC address in MAC address field 115.

An address identifier associated with the destination address may be compared with an event ID (block 520). Line interface 310-1 may locate a corresponding STT entry 140 based on STT index field 130 of MAC entry 110. For example, line interface 310-1 may compare STT index field 130 with STT index field 145 of entries in STT 135 to determine that STT entry 140 corresponds to the MAC entry 110. Line interface 310-1 may compare timestamp field 120 with event ID field 150.

It may be determined whether the address ID and the event ID match (block 525). Event ID comparer 320 may determine whether an event occurred based on the comparison of timestamp field 120 and event ID field 150. In other words, line interface 310-1 may determine whether the forwarding information in MAC entry 110 is reliable. For example, as previously described, when a MAC address is learned (e.g., first received), MAC entry 110 may be created and a corresponding STT entry 140 may be created. At such time, timestamp field 120 and event ID field 150 may include the same information. For example, timestamp field 120 and event ID field 150 may include the time in which the MAC address was learned. Thereafter, when an event occurs, the information in event ID field 150 may change. For example, event ID field 150 may be changed to reflect a time when an event occurs. It will be appreciated, however, that timestamp field 120 and event ID field 150 may include an identifier that may not be a timestamp and/or may not be indicative of a time. For example, timestamp field 120 and event ID field 150 may each include any type of value that may be compared. A value associated with event ID field 150 may change when an event occurs.

As illustrated in FIG. 5, when it is determined that timestamp field 120 and event ID field 150 match (block 525-YES), line interface 310-1 may forward the packet to the port associated with the learned destination MAC address (block 530). For example, line interface 310-1 may forward the packet based on port field 125.

On the other hand, when it is determined that timestamp field 120 and event ID field 150 do not match (block 525-NO), then line interface 310-1 may forward the packet according to event response information (e.g., event response field 155) (block 535). For example, as previously described in connection with FIG. 4, the packet may be redirected to another port or broadcast throughout a layer two network. Additionally, in some instances, MAC entries may be flushed. The extent of the MAC flushes may depend on, for example, the STP. For example, when MSTP is employed, the MAC flushes may be specific to a port/virtual local area network (VLAN). In other instances, for example, when STP or RSP is employed, the MAC flushes may be at the port level only.

All other line interfaces may be informed and updated (block 540). For example, event ID field 150 of STT 135 associated with each line interface (e.g., 310-2, 310-3, and 310-4) may be changed to indicate the time the event occurred. Line interfaces 310-2, 310-3, and 310-4 may, for example, flush MAC entries 110 in MAC address forwarding tables 105 and/or perform other operations as previously described.

Although FIG. 5 illustrates an exemplary process 500, in other implementations, fewer, additional, or different processes may be employed. It will be appreciated that timestamp field 120 may be assigned, for example, a timestamp that corresponds to event ID field 150 (e.g., when a last event occurred).

Figure 6A:
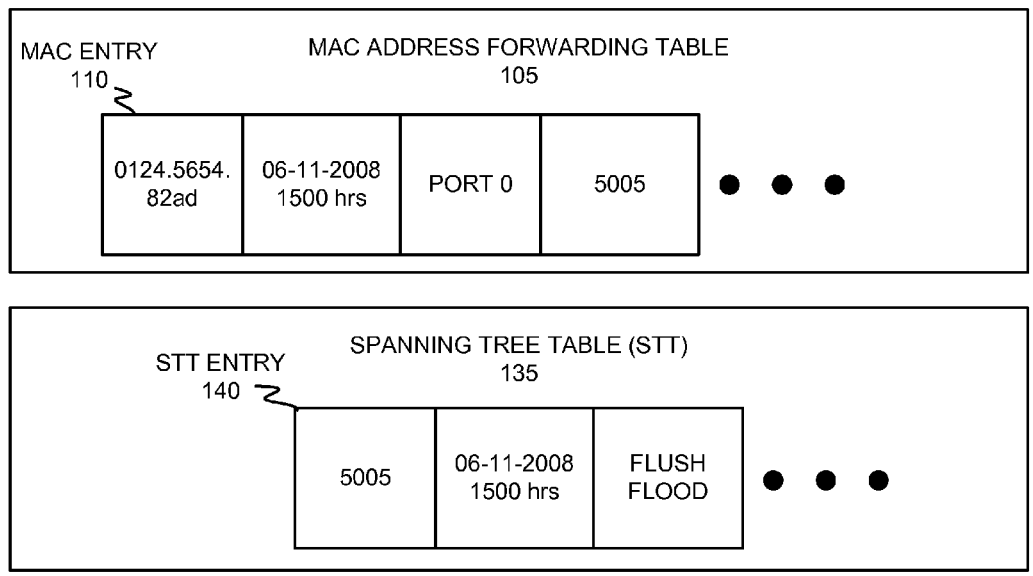
FIGS. 6A-6C are diagrams illustrating an example of the concepts described herein.
Figure 6B:
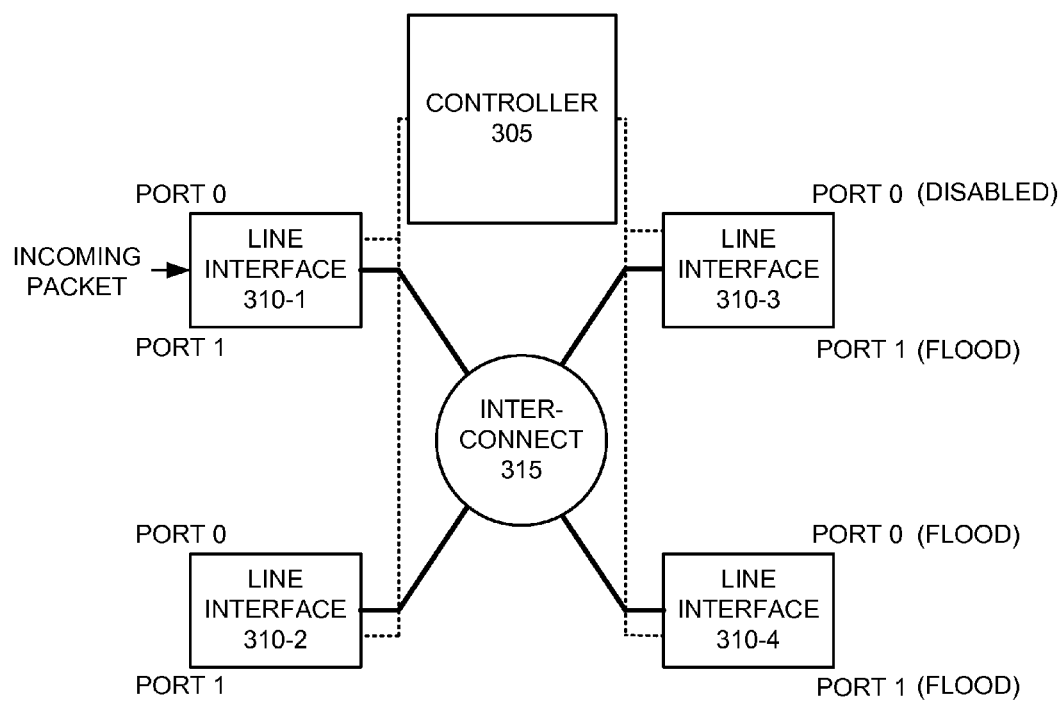
Figure 6C:
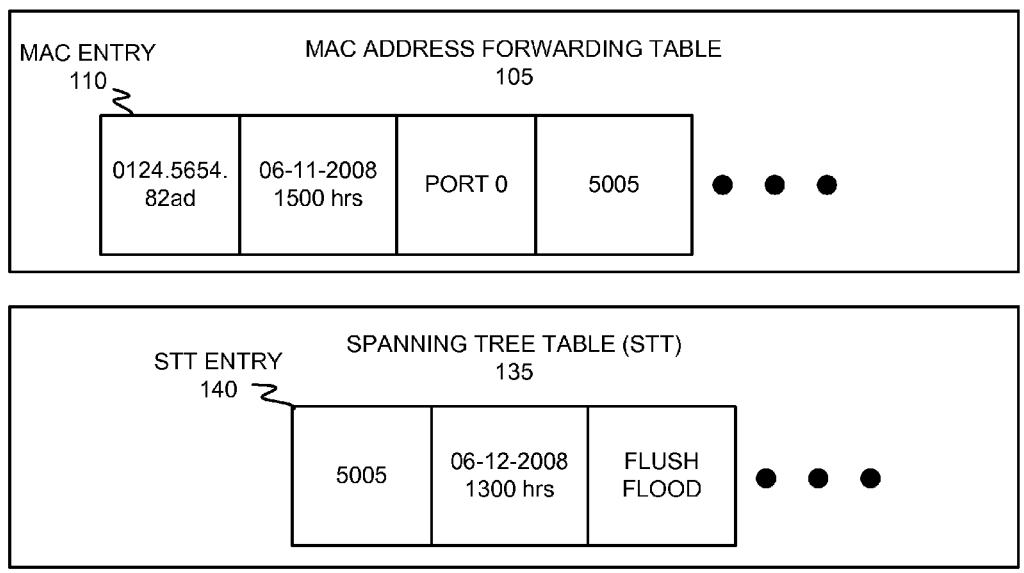

FIGS. 6A-6C are diagrams illustrating an example of the concepts described herein. Assume that line interface 310-1 maintains MAC address forwarding table 105 and STT 135, as illustrated in FIG. 6A. For example, MAC entry 110 may include a MAC address (e.g., 0124.5654.82ad), a timestamp (e.g., 06-11-2008, 1500 hours), a port number (e.g., port 0), and an STT index (e.g., 5005). STT entry 140 may include a corresponding STT index (e.g., 5005), a corresponding timestamp (e.g., 06-11-2008, 1500 hours), and event response information (e.g., flush and flood). The timestamps in MAC entry 110 and STT entry 140 may correspond to a time when the MAC address was learned.

Referring to FIG. 6B, assume that an incoming packet is received at port 1 on line interface 310-1. The destination MAC address for the incoming packet is 0124.5654.82ad. Line interface 310-1 consults MAC address forwarding table 105 and STT 135. However, the state of STT 135 has changed, as illustrated in FIG. 6C. For example, assume that port 0 of line interface 310-3 has become disabled, as illustrated in FIG. 6B, and that the timestamp in STT entry 140 has changed (e.g., to 06-12-2008, 1300 hours), as illustrated in FIG. 6C. Thus, as previously described, line interface 310-1 may not forward the packet to port 0 (e.g., of line interface 310-3). Rather, line interface 310-1 may flush MAC entry 110 and flood the packet throughout the layer two network, as specified in STT entry 140 of FIG. 6C.

CONCLUSION

The foregoing description of implementations provides an illustration, but is not intended to be exhaustive or to limit the implementations to the precise form disclosed. Modifications and variations are possible in light of the above teachings or may be acquired from practice of the teachings.

In addition, while a series of blocks has been described with regard to the process illustrated in FIG. 5, the order of the blocks may be modified in other implementations. Further, non-dependent blocks may be performed in parallel. Further, it may be possible to omit blocks within process 500.

It will be apparent that aspects described herein may be implemented in many different forms of software, firmware, and hardware in the implementations illustrated in the figures. The actual software code or specialized control hardware used to implement aspects does not limit the embodiments. Thus, the operation and behavior of the aspects were described without reference to the specific software code—it being understood that software and control hardware can be designed to implement the aspects based on the description herein.

Even though particular combination of features are recited in the claims and/or disclosed in the specification, these combinations are not intended to limit the invention. In fact, many of these features may be combined in ways not specifically recited in the claims and/or disclosed in the specification.

No element, block, or instruction used in the present application should be construed as critical or essential to the implementations described herein unless explicitly described as such.

What is claimed is:

1. A method comprising:
   receiving, at a first network device, a packet including a destination address associated with a second network device;
   identifying, using the first network device, a destination address entry, in a forwarding table, based on the destination address, where the destination address entry includes an address identifier;
   identifying, from the address identifier, and using the first network device, a timestamp associated with the address identifier;
   identifying, using the first network device, a timestamp associated with an event identifier stored in a spanning tree table (STT) that is associated with the first network device;
   comparing, using the first network device, the timestamp associated with the address identifier and the timestamp associated with the event identifier;
   determining, using the first network device, and based on the comparison, whether an event has occurred; and
   forwarding the packet based on information stored in an event response field, stored in the STT, if it is determined that the event has occurred, where the event response field indicates whether the first network device is to flush one or more address identifiers, flood a network with the packet, or redirect the packet to an alternate path to the second network device.

2. The method of claim 1, further comprising:
   updating, using the first network device, the timestamp associated with the event identifier with a new timestamp when an event occurs, the new timestamp indicating a time subsequent to a time when the destination address was first received by the first network device.

3. The method of claim 1, where the determining further comprises:
   determining, by the first network device, that the event occurred, when the comparison indicates that the timestamp associated with the address identifier does not match the timestamp associated with the event identifier.

4. The method of claim 1, where the event includes:
   a change in a state of a port, or
   a change in a role of a port.

5. The method of claim 1, further comprising:
   forwarding, by the first network device, the packet via a port associated with the destination address, if it is determined that the event did not occur, where the port associated with the destination address corresponds to a port via which the destination address was first received.

6. The method of claim 1, where the destination address includes a media access control (MAC) address, and the method is performed by a layer two network device.

7. A device comprising:
   a forwarding entity to:
      receive, at the device, a packet that includes a destination address associated with another network device;
      identify, using a network device, a timestamp associated with a destination address stored in a forwarding table of the device;
      identify, using a network device, a timestamp associated with an event identifier stored in a spanning tree table (STT) that is stored in the device, where the STT is associated with the forwarding table;
      compare the timestamp associated with the destination address and the timestamp associated with the event identifier to determine whether an event, which effects a forwarding path of the packet, has occurred; and
      forward the packet, if it is determined that the event has occurred, based on information stored in an event response field, which is stored in the SST, and based on the comparison, where the event response field indicates whether the device is to flush one or more destination addresses, flood a network with the packet, or redirect the packet to an alternate path to the other network device.

8. The device of claim 7, where the device includes a switch or a bridge.

9. The device of claim 7, where the timestamp, associated with the destination address, indicates when the destination address was learned by the device.

10. The device of claim 7, where the destination address includes a media access control (MAC) address and if it is determined that the event occurred, the forwarding entity is configured to:
    flush the MAC address from a MAC address entry.

11. The device of claim 7, where the forwarding entity is configured to:
    update the timestamp associated with the destination address to indicate a time corresponding to when an event occurred.

12. The device of claim 7, where the timestamp associated with the event identifier indicates a time when an event occurred.

13. The device of claim 7, where the device operates according to a spanning tree-based protocol.

14. The device of claim 7, where the forwarding entity includes a line interface and a media access control (MAC) address forwarding table.

15. The device of claim 7, where the forwarding entity is configured to determine that the event occurred when the timestamp, associated with the destination address, and the timestamp, associated with the event identifier, do not match.

16. A computer-readable memory device having stored thereon instructions, executable by at least one processor, the computer-readable memory device comprising:
    one or more instructions to receive a message that includes a destination address associated with a network device;
    one or more instructions to identify a first timestamp that indicates when the destination address was learned;
    one or more instructions to identify a second timestamp associated with an event identifier stored in a spanning tree table (STT);
    one or more instructions to compare the first timestamp and the second timestamp to determine whether an event has occurred;
    one or more instructions to forward the message based on information stored in an event response field, stored in the STT, if it is determined that the event has occurred, and
    one or more instructions to flush one or more destination addresses, flood a network with the message, or redirect the message to an alternate path to the network device, if it is determined that the event has occurred.

17. The computer-readable memory device of claim 16, where the event includes a change in state or a change of designation associated with a port or a communication link.

18. A layer two network device comprising:
  at least one linecard to:
    receive a message that includes a media access control (MAC) control address associated with another network device;
    associate a timestamp, stored in a forwarding table of the layer two network device, with the MAC address;
    identify an event timestamp associated with an event identifier that is stored in a spanning tree table (STT) and that is stored in the layer two network device, where the STT is associated with the forwarding table;
    compare the timestamp and the event timestamp to determine whether an event, which effects a forwarding path of the message, has occurred;
    update the event timestamp when an event occurs that affects the forwarding path; and
    forward the message, if it is determined that the event has occurred, based on information stored in an event response field, which is stored in the SST, and based on the comparison, where the event response field indicates whether the layer two device is to flush one or more MAC entries, flood a layer two network with the message, or redirect the message to an alternate path to the other network device.

\* \* \* \* \*